United States Patent
Schwuger et al.

(10) Patent No.: US 7,134,537 B2
(45) Date of Patent: Nov. 14, 2006

(54) MULTI-PART SYNCHRONIZING RING OF A SYNCHRONIZATION DEVICE

(75) Inventors: Josef Schwuger, Herzogenaurach (DE); Ralf Bössner, Hersbruck (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/899,397

(22) Filed: Jul. 26, 2004

(65) Prior Publication Data

US 2005/0016307 A1    Jan. 27, 2005

Related U.S. Application Data

(63) Continuation of application No. PCT/EP03/00306, filed on Jan. 15, 2003.

(30) Foreign Application Priority Data

Jan. 26, 2002    (DE) ................ 102 03 019

(51) Int. Cl.
*F16D 13/00* (2006.01)

(52) U.S. Cl. ................... 192/53.34; 74/339

(58) Field of Classification Search ............. 192/53.34; 74/339
See application file for complete search history.

(56) References Cited

U.S. PATENT DOCUMENTS

| | | | | |
|---|---|---|---|---|
| 4,698,889 A | * | 10/1987 | Patzer et al. ............. | 29/893.33 |
| 5,788,036 A | * | 8/1998 | Soffa et al. .............. | 192/53.34 |
| 6,588,563 B1 | * | 7/2003 | Sarrach et al. ........... | 192/53.34 |

FOREIGN PATENT DOCUMENTS

| | | |
|---|---|---|
| DE | 30 32 787 | 4/1982 |
| DE | 197 18 905 | 11/1998 |
| DE | 198 53 856 | 5/2000 |
| DE | 198 53 894.4 | 5/2000 |
| DE | 100 63 053 | 7/2001 |
| EP | 1 101 965 | 11/2000 |
| FR | 2 787 536 | 12/1998 |
| GB | 2 357 815 | 7/2001 |
| JP | 08 29 0227 | 11/1996 |

* cited by examiner

*Primary Examiner*—Saul Rodriguez
(74) *Attorney, Agent, or Firm*—Volpe and Koenig, P.C.

(57) ABSTRACT

A multi-part synchronizing ring (1) of a synchronization device with an annular base body (2) and with at least one friction surface (19) on the base body (2), as well as with teeth (3) pointing outwards, has at least one driver element (4, 5), wherein the driver element (4, 5) is formed on an annular disk (6) separate from the base body (2).

15 Claims, 3 Drawing Sheets

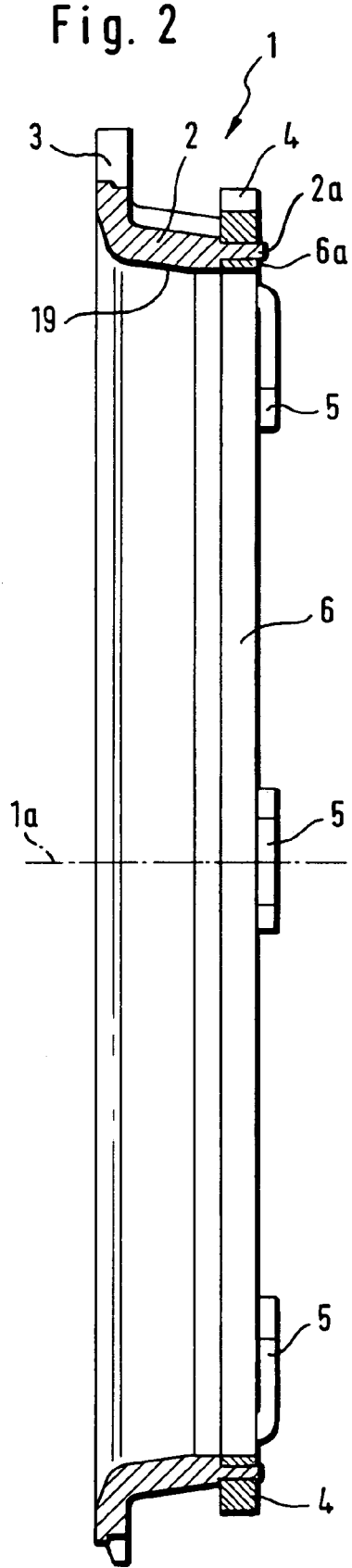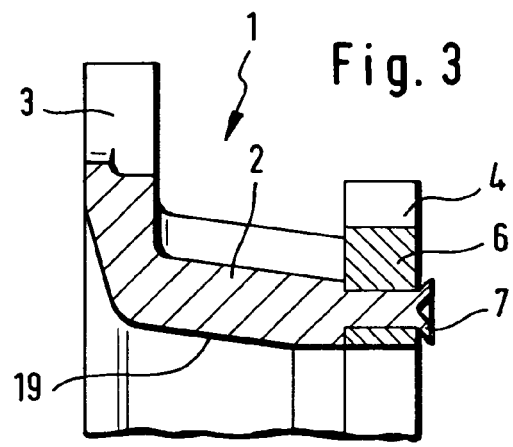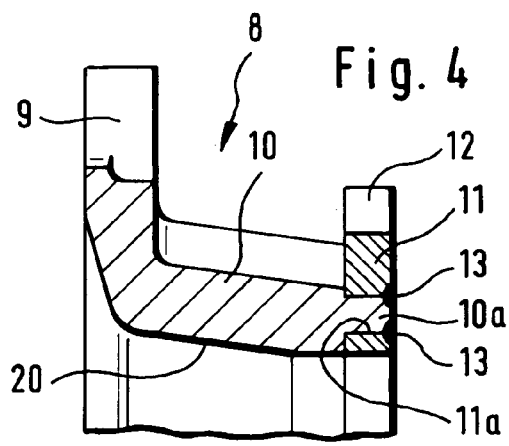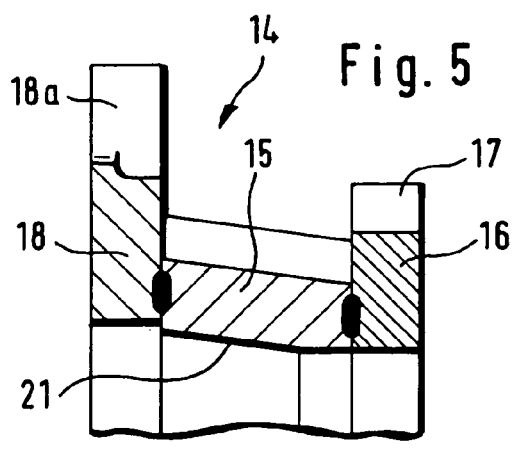

MULTI-PART SYNCHRONIZING RING OF A SYNCHRONIZATION DEVICE

CROSS-REFERENCE TO RELATED APPLICATIONS

This application is a continuation of PCT/EP03/00306, filed Jan. 15, 2003, which is incorporated herein by reference as if fully set forth.

BACKGROUND

The invention relates to a multi-part synchronizing ring of a synchronization device with an annular base body and with at least one friction surface on the base body. The synchronizing ring has teeth pointing radially outwardly on a periphery thereof and at least one driver element projects opposite the teeth in the radial direction on the synchronizing ring.

DE 198 53 856 A1 shows a synchronizing ring produced from sheet metal in a non-cutting shaping process with an essentially conical ring body. At the edge of the synchronizing ring with the larger cone diameter, teeth point radially outwardly and extend around the periphery. At the edge with the smaller cone diameter, catches or driver elements, which point away from the rotational axis of the synchronizing ring, project radially outwardly. These catches or driver elements are provided, e.g., for a positive-fit engagement in a synchronizing body carrier. The catches are formed integrally with the synchronizing ring and shaped so that they extend radially outward. Such a configuration of the synchronizing ring is satisfactory, but it requires a relatively high expense in terms of shaping technology. The expense results from additional processing steps after the formation of the bowl for the synchronizing ring. During these processing steps, the catches or driver elements must be bent to point radially outwardly from the base of the bowl. It is further disadvantageous that the requirements for the material of the synchronizing ring catches partially contradict the requirements on the frictional behavior of the conical friction surface. The catches must be rigid and resistant to wear as much as possible over the entire service life of the transmission. However, preferably different material pairs are used on the friction or counter-friction surfaces of a transmission synchronizer to guarantee, e.g., constant coefficients of friction over the entire service life at higher frictional power. It is known from DE 198 53 894 A1 to produce an outer synchronizing ring from several parts. The synchronizing ring consists of a disk with external teeth and a base body with a conical friction surface. The disk and the base body are manufactured separately and attached to each other. This document contains no information on the materials of the outer synchronizing ring parts. A synchronizing ring with driver elements pointing radially outwardly can be not be produced or can only be produced with great expense according to the method described in this document.

SUMMARY

Therefore, the object of the invention is to create a synchronizing ring, having catches that point inwardly or outwardly are manufactured with a high strength and which further guarantees in the region of the friction surfaces a coefficient of friction that is preferably as constant as possible over the entire service life of the transmission.

This object is solved according to the invention, wherein the driver elements or catches are formed on an annular disk that is separate from the base body. Here, the driver elements project radially outwardly from the disk, pointing away from the rotational axis of the synchronizing ring, or alternatively point radially inwardly towards the rotational axis. The separate production of the disk with the catches and driver elements, as well as the base body of the synchronizing ring, permits a flexible shaping of the synchronizing ring adapted to the specific requirements.

Thus, configurations of the invention produce disks, for which the driver elements are formed with an angled cross section. Here, starting from the sheet of the disk, the driver elements project from the disk at an angle from the end of the synchronizing ring. According to the configuration of the driver elements, these are then bent inwards or outwards in the radial direction through further shaping.

The end projecting portion of the driver element imparts a larger contact surface to the driver element at the edges of the driver element pointing in the circumferential direction. At the edges of the driver element engaging, e.g., in a recess of the synchronizing body carrier, the contact pressure at the contact to the receiver is reduced. The length of the section of the driver element projecting at the end from the disk can be adapted to the axial distances between the driver element and the recess, so that greater distances between the synchronizing ring and the synchronizing body carrier can also be bridged in terms of construction and function by means of the driver element.

Such a disk can be produced from sheet metal, and its shaping by means of stamping and then bending or pressing is simple and economical.

In another configuration of the invention, the L-shaped driver elements projecting from the end of the disk have widened edges pointing in two rotational directions of the synchronizing ring. The edges are shaped from the sheet metal of the driver element. Here, sections of the driver elements are bent in the direction of the external teeth. This achieves improved contact of the synchronizing ring with its driver elements on the synchronizing body carrier in the rotational direction. Alternatively, the driver element has an L-shaped cross-section or else also a driver element projecting from the disk that is un-bent in the radial direction is then bent, such that the sections point away from the teeth and thus from the synchronizing ring. The widened edges also point in the rotational directions for the last mentioned configuration.

In a preferred configuration of the invention, the base body is connected rigidly to the disk. An integrated component of high strength and dimensional accuracy is produced. The invention is further configured in that the base body and the disk are welded to each other. The disk and the base body are here formed from steel, wherein the base body is provided selectively with a friction coating. Alternatively, the disk is produced from a steel material that can be welded with brass and the base body is formed from brass. The base body and the disk are preferably welded to each other.

For attaching the disk to the base body, in another configuration of the invention, the base body has tabs projecting on the end from the base body and extending in a direction of the rotational axis. The tabs on the base body engage in a positive-fit connection in recesses adapted to the shape of the tabs in the disk. The disk itself is preferably a stamped part. The recesses in the disk are preferably stamped through holes. The tabs are further welded in the recesses or on the disk. Alternatively, in one configuration, the tabs are introduced into the recesses in a positive-fit connection and the tabs are then plastically deformed so that the base body and the disk are connected to each other so that they cannot be detached. This additional bending of the tabs gives increased retention and increased strength.

The individual parts of base body and disk can be produced with different manufacturing methods. In one configuration of the invention, the base body is a shaped part, e.g., a drawn or pressed part, and the disk is a stamped part. Furthermore, separate production of the base body and the disk permit the use of different material thicknesses. Thus, the base body and the disk are definitely formed from sheet metal, but the base body is shaped from sheet metal, whose thickness in its original state is different from the thickness of the sheet metal of the disk. Furthermore, for the sheet metal of the base body, a different steel material is used than for the sheet metal of the disk. The base body and the disk made from the same or different steel materials preferably have different degrees of hardness at least at their surfaces. For this purpose, the base body and the disk are surface treated or hardened differently and/or differ at least in the hardness at their surface. Here, particular methods for hardening the components, such as case hardening, full hardening, or nitrocarburizing are provided. It is also conceivable to connect a hardened disk with the driver element to a base body made from a non-hardened material.

Finally, another configuration provides a three-part synchronizing ring. Here, the teeth of the synchronizing body are formed from steel separately from the base body. The base body is made from brass or at least coated with brass. Furthermore, the disk, which is made from steel, is attached to the base body. The teeth are preferably made from a steel material that can be welded with brass and attached to the base body through welding.

For the production of the friction surface or for the production of the entire base body, a weldable brass alloy is used, which preferably contains 50–75% copper. A copper alloy with good weldability includes 55–60% copper, 30–40% zinc, the remainder lead, aluminum, manganese, iron, and tin. Corresponding alloy designations are: CuZnAl1; CuZn15; CuZn37; CuZn31Si; CuZn39Pb1Al—C-GM. The welding of the copper alloy with the steel is performed by a resistance welding method. Here, preferably spot welding, butt-seam welding, roll-seam welding, projection welding, medium-frequency resistance welding, or capacitor-pulse welding is provided. For the spot and roll-seam welding, the current is supplied at a point or along a seam position by a roller. For projection welding, raised sections (projections) are provided on the surfaces to be welded. The current then preferably flows through these projections, so that the welding begins at these positions. The medium-frequency resistance welding provides medium-frequency systems with inverters, which have an intermediate frequency of ca. 1000 Hz. For the capacitor-pulse welding, a very transient current flow is applied by a capacitor, which guarantees welding that is very gentle to the material. It should be mentioned that the welding can be performed not only by the previously mentioned welding methods, but also by friction welding, wherein the welding energy is generated through friction, pressure, temperature, and shaping. For the welding of steel with steel, preferably laser welding and capacitor discharge welding methods are provided.

On a synchronizing ring according to the invention, the friction surface portion is greater than on synchronizing rings from the state of the art for comparatively equal synchronizing ring widths. The length of the friction cone can be increased, because for the multi-part design, no drawing radius is necessary from the cone to the base surface for the drawn bowl. The coating of the individual or of two cone surfaces on the synchronizing ring is simpler. It is performed preferably before the joining of the individual parts of the synchronizing ring.

Friction coatings are used in film form. In the connecting gap between the base body and the disk, a friction coating in film form is also secured, e.g., by clamping.

By selecting different sheet thicknesses and/or material types for the base body and the disk, an optimum compromise can be reached between function and costs for the production of the individual parts. The processing times are shortened, because, e.g., the grinding of the friction surfaces on the base body without catches is simplified.

BRIEF DESCRIPTION OF THE DRAWINGS

The invention is explained in more detail in with reference to the following exemplary embodiments. In the drawings:

FIG. 2 is a cross-sectional view of the synchronizing ring according to FIG. 1, FIG. 3 is an enlarged section cut of another synchronizing ring according to the invention, for which the disk and the base body are attached to each other in a positive-fit connection and secured to each other by stamping, FIG. 4 is an enlarged section cut of another synchronizing ring according to the invention, for which the disk and the base body are attached to each other in a positive-fit connection and are secured to each other by welding, FIG. 5 is an enlarged section cut of a three-part synchronizing ring according to the invention, for which the teeth and the disk are connected to the base body by welding.

DETAILED DESCRIPTION OF THE PREFERRED EMBODIMENTS

Figure 1:
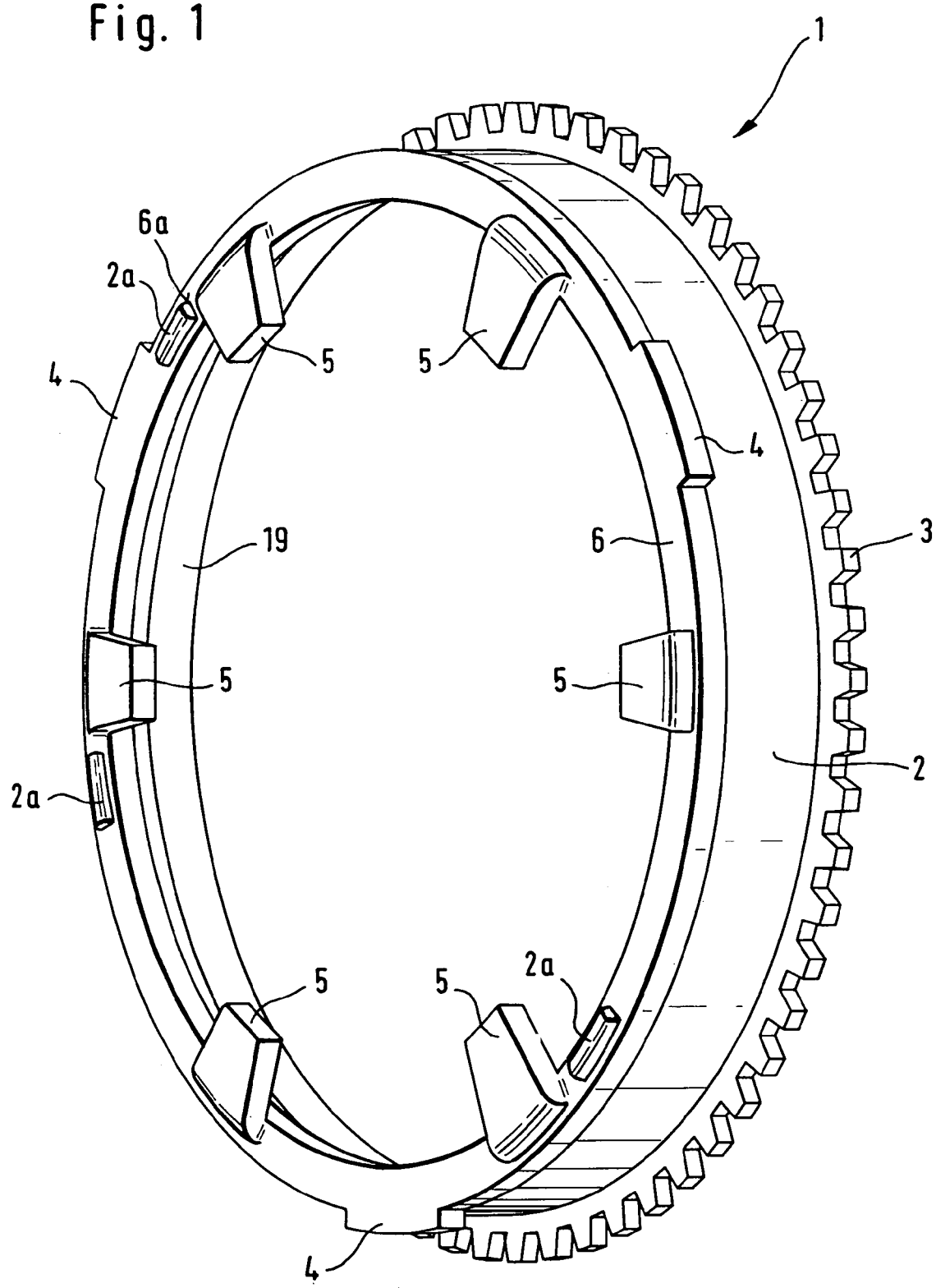
FIG. 1 is a perspective view of an embodiment of a synchronizing ring according to the invention, for which the disk and the base body are attached to each other by a positive-fit connection.

In FIGS. 1 and 2, an outer synchronizing ring 1 is shown as one embodiment of the invention. The outer synchronizing ring 1 has an annular base body 2. A friction surface 19 is located on the inside, and on the periphery, radially outwardly pointing teeth 3 are formed on the base body 2. On the side of the outer synchronizing ring 1, opposite the teeth 3, driver elements 4 and 5 project in the radial direction. The driver elements 4 and 5 are formed on an annular disk 6 separate from the base body 2. Here, the driver elements 4 point radially outwardly from the rotational axis 1*a* of the outer synchronizing ring 1 (FIG. 2) and the driver elements 5 point radially inwardy towards the rotational axis 1*a*. The base body 2 is formed from a bowl-like molded part and the disk 6 is stamped from sheet metal. Tabs 2*a* extend with the rotational axis 1*a* from the base body 2 on the end. The tabs 2*a* engage in a positive-fit connection in recesses 6*a* of the disk 6, so that the base body 2 and the disk 6 are connected rigidly to each other.

FIG. 3 shows an alternative attachment of the disk 6 to the base body 2. By means of pressing 7, the material of the tabs 2*a* is plastically deformed into the recesses. The tabs 2*a* and the disk 6 are connected to each other in a non-detachable way by means of the positive-fit connection and also by the pressing 7.

FIG. 4 shows a section cut through a synchronizing ring 8, having a base body 10 with a friction surface 20 formed integrally with teeth 9, and includes tabs 10a projecting from the base body 10 on the end. The tabs 10a engage with a positive-fit connection in recesses 11a of a disk 11 with driver elements 12. The disk 11 is secured by welds 13 to the tabs 10a of the base body 10. The driver elements 12 project radially outwardly from the rotational axis (not shown) of the synchronizing ring 8 pointing away from the disk 11. The base body 10 is shaped from a metal sheet, which is thicker in its original state than the metal sheet of the disk 11.

FIG. 5 shows a section cut through a part of a synchronizing ring 14. The synchronizing ring 14 is formed in three parts and has a base body 15 made from brass with a friction surface 21, a disk 16 with driver elements 17, and also a crown gear 18 with teeth 18a. The driver element 17 and the crown gear 18 are produced from steel and welded with the base body 15.

Figures 6, 6A:
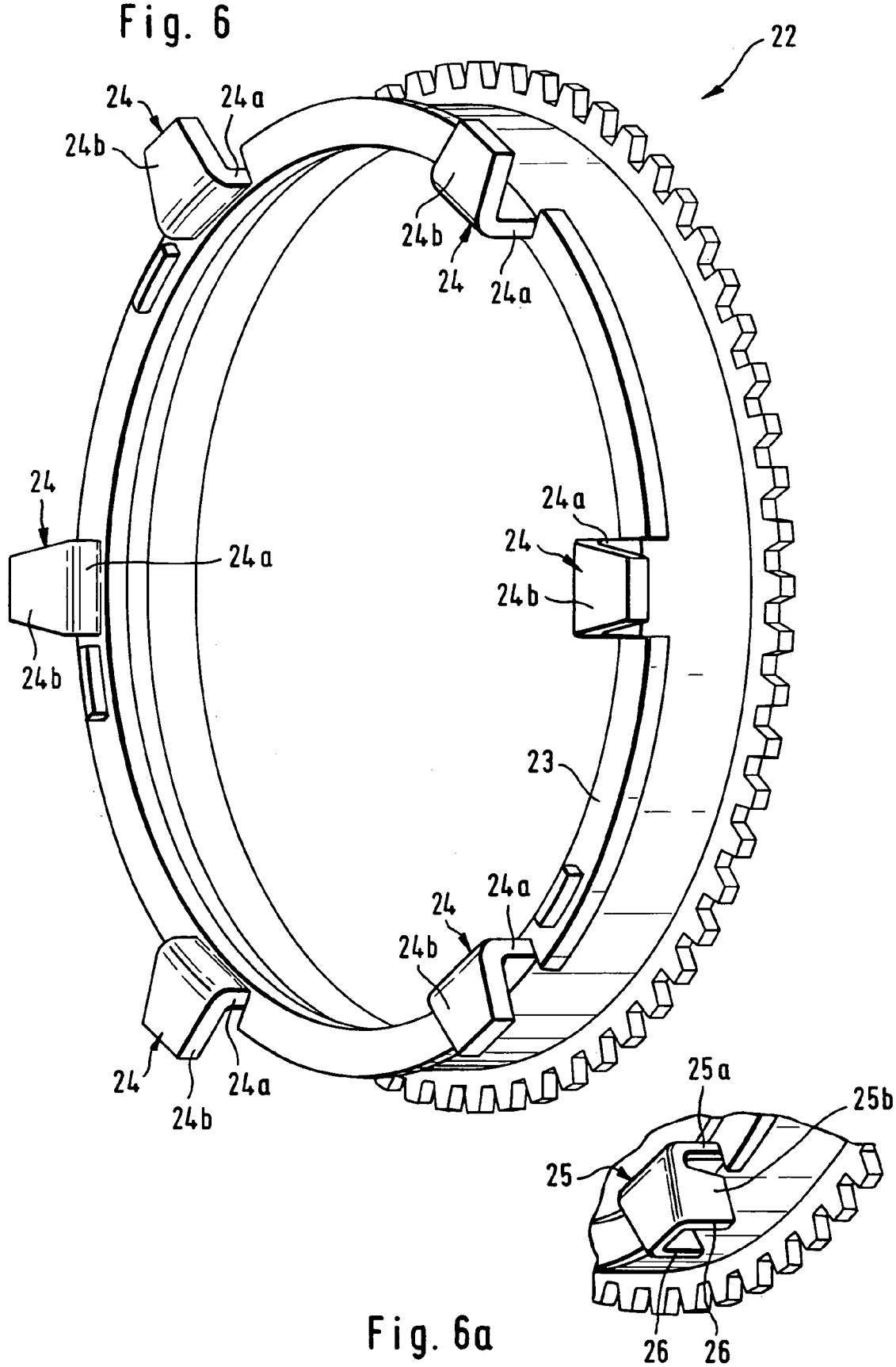
FIG. 6 is a perspective view of another embodiment of a synchronizing ring according to the invention with drive elements directed radially outwardly.
FIG. 6*a* is an alternative view of the drive element on the synchronizing ring according to FIG. 6.

FIG. 6 shows an outer synchronizing ring 22, which corresponds in its design generally to the outer synchronizing ring 1. A disk 23 is attached to the outer synchronizing ring 22, whose driver elements 24 are directed outwards in the radial direction. The driver elements 24 are bent from the disk 23 at an angle. Here, a section 24a of the driver element projects from the end of the disk 23 pointing away from the outer synchronizing ring 22. A section 24b is at the end of section 24a. The section 24b extends at an angle from the section 24a outwards in the radial direction. The driver element 25 initially has the sections 25a and 25b. Two other sections are bent from the driver element 25 extending outwards in the radial direction from the section 25a. These sections form the edges 26 of the driver element.

REFERENCE SYMBOLS

1 Outer synchronizing ring
1a Rotational axis
2 Base body
2a Tab
3 Teeth
4 Driver element
5 Driver element
6 Disk
6a Recess
7 Pressing
8 Synchronizing ring
9 Teeth
10 Base body
10a Tab
11 Disk
11a Recess
12 Driver element
13 Weld
14 Synchronizing ring
15 Base body
16 Disk
17 Driver element
18 Crown gear
18a Teeth
19 Friction surface
20 Friction surface
21 Friction surface
22 Outer synchronizing ring
23 Disk
24 Driver element
24a Section
24b Section
25 Driver element
25a Section
25b Section
26 Edge

The invention claimed is:

1. Multi-part synchronizing ring comprising an annular base body and at least one friction surface on the base body, the synchronizing ring includes teeth pointing radially outwardly located on a periphery thereof and at least one driver element projects from the synchronizing ring in a radial direction opposite the teeth, the driver element is formed as a stamped annular disk separate from the base body that is connected to the base body after forming, the teeth are axially spaced apart from the driver element, and the driver element is formed with an angled cross section, and projects axially starting from the disk at an angle from an end of the synchronizing ring and bends outwardly in the radial direction.

2. Synchronizing ring according to claim 1, wherein the driver element projects radially outwardly from a rotational axis of the synchronizing ring pointing away from the disk.

3. Synchronizing ring according to claim 2, wherein the driver element has widened edges pointing in both directions of rotation, and the edges are sections angled from the driver element in a direction of the teeth.

4. Synchronizing ring according to claim 1, wherein the base body and the disk are connected rigidly to each other.

5. Synchronizing ring according to claim 4, wherein the base body and the disk are welded to each other.

6. Synchronizing ring according to claim 5, wherein the disk is produced from a steel material that can be welded with brass and the base body is made from brass and is welded to the disk.

7. Synchronizing ring according to claim 4, wherein the base body has tabs, which project from an end of the base body and which extend in a direction of a rotational axis thereof, wherein the tabs engage in a positive-fit connection in recesses in the disk.

8. Synchronizing ring according to claim 7, wherein the tabs and the disk are welded to each other.

9. Synchronizing ring according to claim 7, wherein the base body and the disk are connected to each other in an undetachable manner by material of the tabs plastically deformed in the recesses.

10. Synchronizing ring according to claim 1, wherein the base body and the disk are formed from sheet metal, the base body is a shaped part and the disk is a stamped part.

11. Synchronizing ring according to claim 1, wherein the base body and the disk are formed from sheet metal, and the base body is formed from a metal sheet having a thickness that differs in an original state from a thickness of a metal sheet of the disk.

12. Synchronizing ring according to claim 1, wherein the base body and the disk are formed from sheet metal, and a metal sheet of the base body is made from a different steel than a metal sheet of the disk.

13. Synchronizing ring according to claim 1, wherein the base body and the disk are formed from a steel sheet, wherein the steel sheet of the base body and the steel sheet of the disk have degrees of hardness differing from each other at least at respective surfaces thereof.

14. Synchronizing ring according to claim 1, wherein the teeth is formed from steel separately from the base body and the base body is made from brass.

15. Synchronizing ring according to claim 14, wherein the teeth are made from a steel material that can be welded with brass and the base body is welded to the teeth.

* * * * *